United States Patent [19]

Steiss et al.

[11] Patent Number: 5,047,973
[45] Date of Patent: Sep. 10, 1991

[54] HIGH SPEED NUMERICAL PROCESSOR FOR PERFORMING A PLURALITY OF NUMERIC FUNCTIONS

[75] Inventors: Donald E. Steiss, Richardson; Maria B. Hipona, Dallas; Henry M. Darley, Plano, all of Tex.

[73] Assignee: Texas Instruments Incorporated, Dallas, Tex.

[21] Appl. No.: 343,465

[22] Filed: Apr. 26, 1989

[51] Int. Cl.$^5$ ............................ G06F 7/52; G06F 7/38
[52] U.S. Cl. .................................... 364/754; 364/752; 364/761
[58] Field of Search ........ 364/736, 752, 754, 757-759, 364/761, 764, 766, 749

[56] References Cited

U.S. PATENT DOCUMENTS 3,535,498 10/1970 Smith, Jr. ............................ 364/764
4,754,421 6/1988 Bosshart ............................. 364/754
4,825,401 4/1989 Ikumi ................................. 364/760

OTHER PUBLICATIONS

Agrawal, "High-Speed Arithmetic Arrays", *IEEE Trans. on Computers*, vol. C-28, #3, pp. 215-224, Mar. 1979.

Zurawski, "Design of High-Speed Digital Divider Units", *IEEE Trans. on Computers*, vol. C-30, #9, pp. 691-699, 9/81.

*Computer Arithmetic*, by Kai Huang, John Wiley & Sons, pp. 252-259.

*Primary Examiner*—Dale M. Shaw
*Attorney, Agent, or Firm*—B. Peter Barndt; James T. Comfort; Melvin Sharp

[57] ABSTRACT

Division and square root calculations are performed using an operand routing circuit (16) for receiving an operand N, and operand D and a seed value S and directing the operands and seed value to a multiplier (38). Single multiplier (38) is configured into two arrays for calculating partial products of N and S and D and S. The results of multiplier (38) are transmitted through switching circuitry (20) or registers (48) (50) either to operand routing circuitry (16) or adder (44) depending on a convergence algorithm. The final result is rounded.

14 Claims, 1 Drawing Sheet

HIGH SPEED NUMERICAL PROCESSOR FOR PERFORMING A PLURALITY OF NUMERIC FUNCTIONS

RELATED APPLICATIONS

"FLOATING POINT/INTEGER PROCESSOR WITH DIVIDE AND SQUARE ROOT FUNCTIONS", by Henry Merrick Darley et al., filed Jan. 29, 1988, Ser. No. 150,363, now U.S. Pat. No. 4,575,190.

TECHNICAL FIELD OF THE INVENTION

This invention relates in general to information handling systems, and more particularly to a processor for performing divide and square root calculations at high speeds.

BACKGROUND OF THE INVENTION

High speed arithmetic computation is a critical design factor in many information handling systems such as computers, signal processors and process controllers. These systems increasingly rely on large scale integrated circuits employing highly parallel designs to provide high speed calculations. While devices that perform multiplication using parallel techniques are widely available, devices for performing the division and square root functions are generally serial in nature and therefore operate at slower speeds.

Calculating division and square roots, unlike addition, subtraction or multiplication, is an iterative process. An apparatus or circuit for performing the division or square root function will take a number of steps or clock cycles to arrive at a quotient or root value. The execution time and accuracy of an information handling system can be greatly affected by the technique employed for performing the division and square root functions. One known technique involves using a convergence algorithm.

In division, a convergence algorithm treats the dividend and divisor as a fraction. If repeated multiplication of the divisor (i.e. the denominator of the fraction) by some function of the divisor forces the denominator to one in the limit, then repeated multiplication of the dividend by the same function will force it to the quotient in the limit. In a square root calculation, the number for which the square root is to be determined is treated as a fraction where the number is the same for the numerator and denominator. Repeated multiplication of the fraction by some function forces the denominator to one and the numerator to the square root in the limit.

Division and square roots, in information handling systems, can be performed by employing high speed multipliers in conjunction with other circuitry operating in accord with a convergence algorithm. A typical convergence algorithm requires repeated multiplication steps to arrive at a result. As a consequence, prior art high speed multipliers require at least three clock cycles for each duration of the convergence algorithm. Hence, division and square root calculations require a substantial amount of time relative to other calculations.

Because of the desire for ever faster information handling systems, a need has arisen to provide a processor which is capable of high speed division and square root calculations.

SUMMARY OF THE INVENTION

In accordance with the present invention, a processor is provided which substantially eliminates or prevents the disadvantages and problems associated with performing high speed division and square root calculations. In one embodiment, a high speed numerical processor is provided that performs division in four clock cycles and square roots in six clock cycles.

The processor of the present invention has multiplier circuitry for calculating the product of two numbers. Logic circuitry is provided for reconfiguring the multiplier into a first array and a second array. The first and second arrays of the multiplier calculate products. Operand routing circuitry is provided for directing one set of operands to the first array and other operands to the second array. Registers are provided for directing the products back to the operand routing circuitry a specified number of times or iterations. Finally, adder circuitry is provided for combining the products, after the predetermined number of iterations have been completed, to produce a final result.

A technical advantage of a processor having a multiplier that can be configured in either single or double arrays is that division and square root calculations can be performed using a convergence algorithm. The two arrays of the multiplier permit the calculation of either division or square root to be performed in parallel with fewer clock cycles and thus at much higher speeds.

In a second embodiment, a processor in accord with the present invention performs a plurality of arithmetic functions. The processor comprises decoder circuitry for determining which one of the plurality of arithmetic functions is to be performed. The decoder circuitry then transmits a control signal that is appropriate for the selected arithmetic function. Multiplier circuitry is provided for calculating the product of two numbers. Logic circuitry, which is responsive to the control signal, configures the multiplier circuitry into a first array and a second array in the event either a division or square root calculation is to be performed. The first and second arrays calculate independent products. Operand routing circuitry, also responsive to the control signal of the decoder circuitry, is provided for directing one set of operands to the first array and other operands to the second array in accordance with the control signal. Adder circuitry is provided for combining the products to produce a result. Switching circuitry, responsive to the control signal, is provided for directing the products to the final adder circuitry. The switching circuitry can align or zero the incoming products in accordance with the control signal.

Another advantage of a processor having a multiplier that can be configured in either single or double arrays is that one multiplier can be used to perform different calculations. In a conventional multiplication calculation the multiplier is used in single array mode and for division or square root calculations the multiplier is configured in double array mode. Providing decoder circuitry for selecting one of the two modes enables optimal use of the single multiplier.

BRIEF DESCRIPTION OF THE DRAWINGS

For a more complete understanding of the present invention and the advantages thereof, reference is now made to the following descriptions taken in conjunction with accompanying drawing, in which.

DETAILED DESCRIPTION OF THE PRESENT INVENTION

The processor of the present invention employs two convergence algorithms: one for performing a division calculation and another for performing square root calculations. In division, $X \div Y = Q$ where X is the dividend, Y is the divisor and Q is the quotient. The equation can also be written in the form $X/Y = Q$. In the first step of the division algorithm, X and Y are both multiplied by a seed value S selected to drive Y to one. After the first step, $X*S = Q$ and $Y*S = G$. The next step multiplies Q and G by a function F where $F = 2 - G$. The result of $F*Q$ replaces the old value of Q and the result of $F*G$ replaces the old value of G. The last step is repeated a predetermined number of times such that $F*G$ approaches one and $F*Q$ approaches the quotient of $X/Y$.

In square roots, a square root R of a number A is such that $R*R = A$. In a convergence algorithm for calculating the root value R of a number A, an equation is written of the form $A/A$. In the first step of the convergence algorithm, the A in the numerator position is multiplied by a seed value S and the A in the denominator position is twice multiplied by the same seed value S such that $A*S = Q$ and $A*S*S = G$. In the next step, Q is multiplied by a function F where $F = (3-G)/2$ and G is twice multiplied by the F function. The result $F*Q$ replaces the old Q and the result $F*F*G$ replaces the old G. The last step is repeated a predetermined number of times such that $F*Q$ approaches the root value and $F*F*G$ approaches one.

Figure 1:
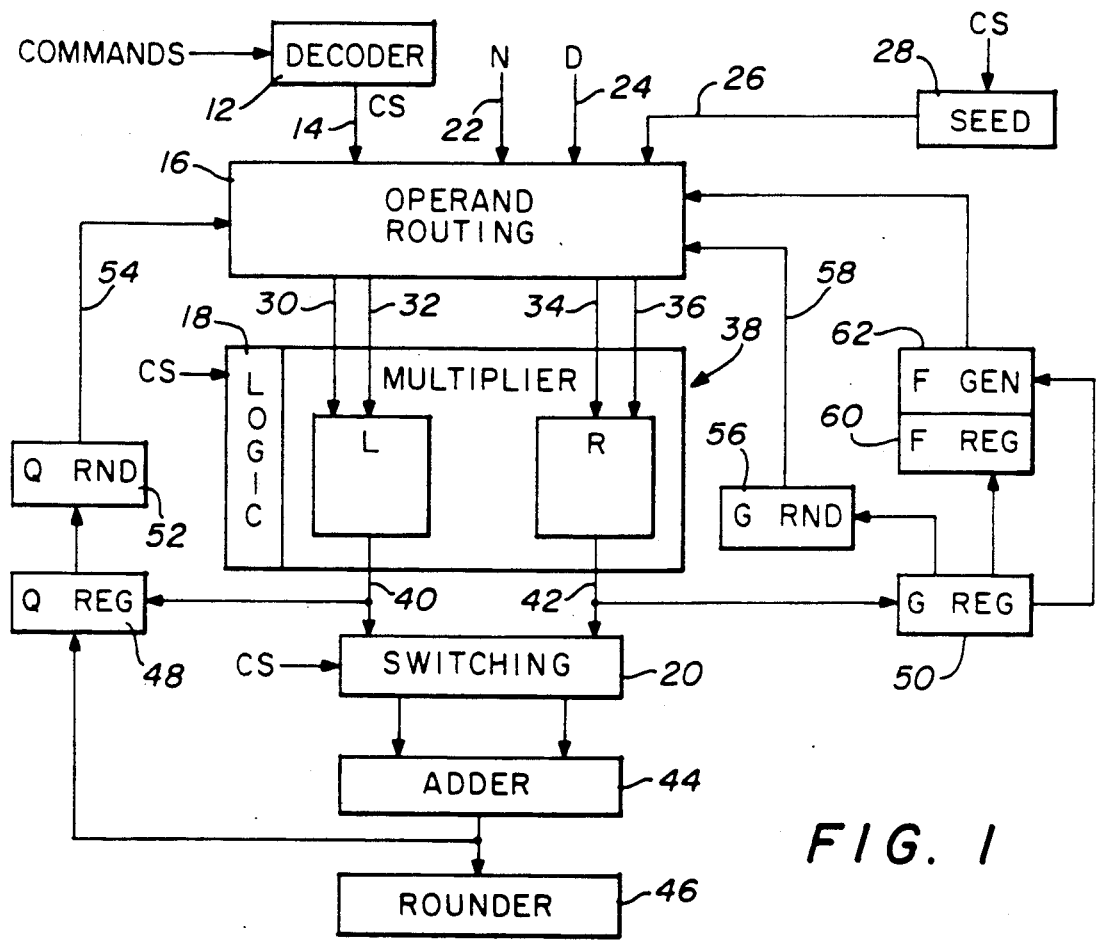
FIG. 1 illustrates the architecture of the processor of the present invention.

Referring to FIG. 1, decoder 12 receives commands from a logic unit (not shown) which determines the numerical calculation to be performed by the processor, such as multiplication, division or square root. In response to the commands, decoder 12 transmits a control signal CS on output 14, there being a different control signal for each of the different types of calculations to be performed. Control signal CS is transmitted to operand routing circuitry 16, logic circuitry 18, switching circuitry 20 and seed generator 28. The control signal instructs the circuitry to perform a specific calculation such as multiplication, division or a square root. The commands are typically generated by a stored program computer or other devices well known to those skilled in the art.

Operand routing circuit 16 receives operands N and D on input lines 22 and 24 and receives seed value S from seed generator 28 on input line 26 and routes them to appropriate output lines connected to multiplier 38. Operand routing circuitry 16 transmits operand N and seed value S on output lines 30 and 32 and transmits operand D and seed value S on output lines 34 and 36. Operand N represents the numerator of the fraction and Operand D represents the denominator of the fraction. A number upon which a calculation is to be performed will be normalized and put into fraction notation of the form N/D as is well known to those skilled in the art.

Logic circuitry 18 of multiplier 38 receives control signal CS from decoder 12 and, in the event that signal requires either a division or square root calculation, reconfigures multiplier 38 into two arrays labeled L and R. Operand routing circuitry 16 routes operand N and seed value S to the L array and routes operand D and seed value S to the R array. The output of array L is transmitted along line 40 to switching circuitry 20 and the output of array R of multiplier 38 is transmitted along line 42 to switching circuitry 20.

Switching circuitry 20 in response to control signal CS from decoder 12, directs the outputs of multiplier arrays L and R along a predetermined path in accord with the type of calculation to be performed. After making a predetermined number of passes through multiplier 38, switching circuitry 20 directs the output of arrays L and R of multiplier 38 to adder 44. The output of adder 44 is transmitted to rounder circuitry 46 which perform a rounding function as is well known to those skilled in the art.

Associated with switching circuitry 20 are Q register 48 and G register 50. The Q and G registers receive intermediate results from multiplier 38 through switching circuitry 20 and feed those intermediate results back to operand routing circuitry 16. Rounding circuitry associated with each of the Q and G registers is provided increasing the precision of the results. Q rounder 52 receives the output from Q register 48, performs a rounding function and transmits the result to operand routing circuitry 16 along line 54. G round register 56 receives the output from G register 50, performs the rounding function, and transmits the output along line 58 to operand routing circuitry 16.

Also associated with the G register 50 is F register 60 and F generator 62. Those registers are employed during certain steps associated with the square root function which will be more fully explained hereinafter.

Figure 2:
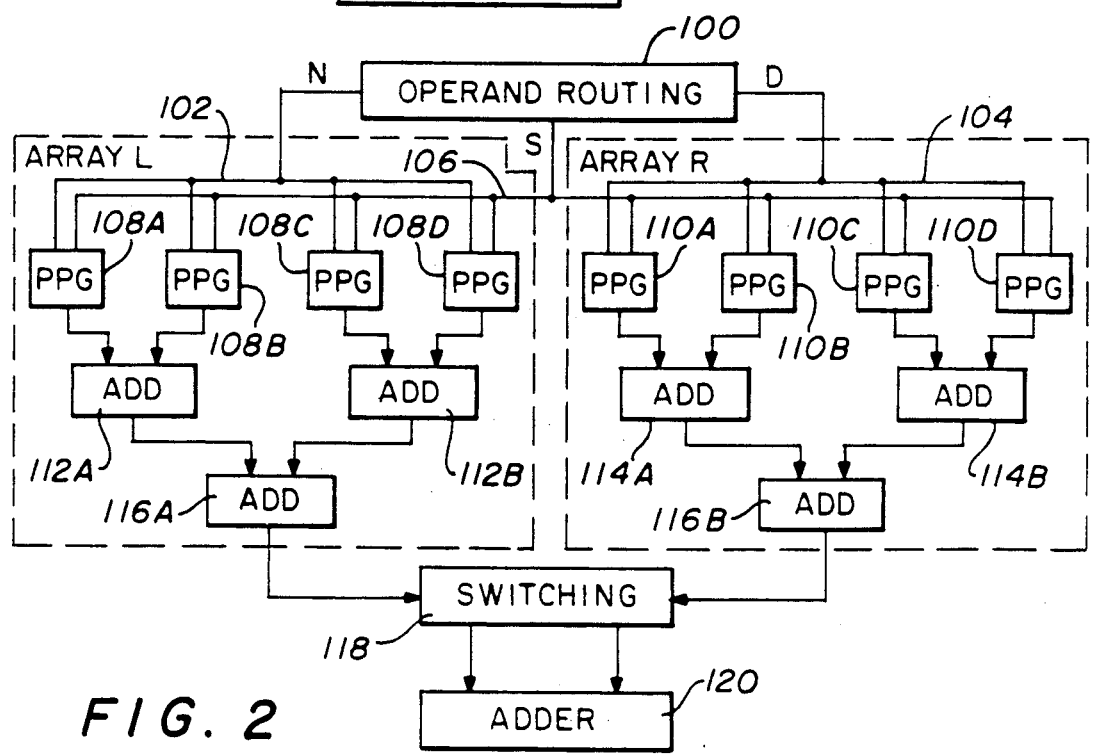
FIG. 2 is a functional block diagram of multiplier circuitry for use in the present invention.

Referring now to FIG. 2, the multiplier circuitry for use in the present invention will be more fully explained. Multiplication, as is well known to those skilled in the art, can be performed using an adder tree. The architecture for adder trees is well known. One such device is described in the copending application Ser. No. 149,779 owned in common with the assignee of this application. This invention modifies the multiplier described in application Ser. No. 149,779 by reconfiguring that multiplier into two separate arrays.

The operand routing circuitry 100 directs operand N (now characterized as the multiplicand) to a bus 102. Operand D (now a multiplicand D) is directed to bus 104. Seed value S is directed by operand routing circuitry 100 to bus 106. Seed value S is now referred to as multiplier S. Bus 102 is connected to the full precision ports of a partial product generators 108 A-D and bus 104 is connected to the full precision ports of a second set of partial product generators 110A-D. Bus 106 is connected to the half precision ports of both sets of partial products generators 108A-D and 110A-D.

Partial product generators 108A and B are connected to first level adder 112A. Partial product generators 108C and D are connected to first level adder 112B. Partial product generators 110 A and B are connected to first level adder 114A and partial product generators 110 C and D are connected to first level adder 114 B. The outputs of the first level adders are paired and connected to second level adders 116 A and B. The outputs of first level adders 112 A and B are connected to the inputs of second level adder 116 A and the outputs of first level adders 114 A and B are connected to the input of second level adder 116 B. The output of the second level adders 116 A and B are directed to the switching circuitry 118 for routing through the system and to final adder 120.

A two-array multiplier, such as that described, can be configured either to multiply one pair of numbers or two pairs of number. In one mode, multiplier 38 is configured as a single array, the N value and D value are equal and the multiplier operates in the fashion described in application Ser. No. 149,779. In a second mode, multiplier 38 is divided into two arrays for performing operations in parallel.

The operation of an apparatus built in accord with the invention will now be described. For each operation, control signals CS, indicating the type of calculation to be performed, are generated by decoder 12. In the present embodiment, there are three control signals denoting multiply, divide and square root. In response to the received control signal, operand routing circuit 16, logic circuit 18 and switching circuit 20 determine the data path and number of iterations through multiplier 38.

Multiplication

Clock cycle 0: Operands N and D enter multiplier 38. Lines 30 through 36 are used by operand routing circuit 16 to transmit the multiplier operands onto the four ports on the L array and R array of multiplier 38. Operand N is routed to the full precision port of the L array of multiplier 38, and operand D is routed to the half precision port of the R array of multiplier 38. The product of N and D is passed through switching circuit 20 to the adder 44.

Clock cycle 1: The number in adder 44 is passed to rounder 46 and is rounded as is well known to those skilled in the art. In this clock cycle, operand routing circuit 16 and multiplier 38 are free for another operation.

Division

Clock cycle 0: Operands N and D enter operand routing circuit 16 of the processor. Seed value S is retrieved from seed generator 28, which can be a lookup table, using a portion of D as the index. Control signal CS from decoder 12 instructs the operand routing circuit 16 and multiplier 38 to produce the partial products of N and S and the partial products of D and S. Multiplier 38 is reconfigured into L and R arrays. N is directed on bus 102 to the full precision ports of array L and D is directed on bus 104 to the full precision ports of array R. The S value is sent to the half precision ports of multiplier 38 on bus 106. The product of N and S is stored in Q register 48 and the product of D and S is stored in G register 50 at the end of the clock cycle.

Clock cycle 1: F is computed from the value stored in G register 50 at the end of clock cycle 0. Multiplier 38 remains configured in two array mode to produce the product of Q and F and the product of G and F, where in both multiplications, F is connected to the half precision ports by bus 106. The product of G and F is routed back to G register 50, and the product of Q and F is routed back to Q register 48.

Clock cycle 2: F is computed from the value stored in G register 50 at the end of clock cycle 1. Multiplier 38 is reconfigured in single array mode to produce the product of Q and F. The product of F and Q is routed through switching circuit 20 to adder 44. The output of adder 44 is transmitted to rounder 46. The number stored in rounder 46 is the estimate of the quotient that will be rounded in the next clock cycle.

Clock cycle 3: The number in rounder 46 is rounded as is well known to those skilled in the art. In this clock cycle, the operand routing circuit 16 and multiplier 38 are free for another operation.

Square Root

Clock cycle 0: Operands N and D enter operand routing circuit 16 of the processor. Seed value S is retrieved from seed generator 28, which can be a lookup table, using a portion of D, as the index. Multiplier 38 is configured into two arrays to produce the partial products of N and S and the partial products of D and S. N is directed on bus 102 to the full precision ports of array L and D is directed on bus 104 to the full precision ports of array R. The S value is sent to the half precision ports of buses 106. The results are routed through switching circuit 20 and the product of N and S is stored in Q register 48 and the product of D and S is stored in G register 50 at the end of the clock cycle.

Clock cycle 1: The value in Q register 48 is not modified during this clock cycle. Multiplier 38 is reconfigured as a single array to operate on the G value from G register 50 and the seed value S. The product of the S and G is routed back to G register 50.

Clock cycle 2: F is computed from the value stored in G register 50 at the end of clock cycle 1. Multiplier 38 is reconfigured as two arrays to produce the partial product of Q and F, and the partial product of G and F. The product of F and Q is routed back to G register 50. The F value computed at the beginning of clock cycle 2 is saved in F register 60.

Clock cycle 3: The value in Q register 48 is not modified during this clock cycle. Multiplier 38 is reconfigured into a single array to operate on the value from G register 50 and the F value stored in F register 60. The product of F and G is routed back to G register 50.

Clock cycle 4: F is computed from the value stored in G register 50 at the end of clock cycle 1. Multiplier 38 remains in single array mode to produce the product of Q and F. The product of F and Q is routed through switching circuit 20 to adder 44. The output of adder 44 is transmitted to rounder 46.

Clock cycle 5: The number in rounder 46 is rounded as is well known to those skilled in the art. In this clock cycle, operand routing circuit 16 and multiplier 38 are free to begin another operation.

From the foregoing description it will be seen by those having skill in the art that under the present invention a numerical processor is provided with a single multiplier that can be configured to operate in either single or double stage mode. The use of a double array multiplier results in performing division and square root calculations with a high degree of parallelism and higher speeds than has been previously possible. While the invention has been particularly shown and described with reference to a preferred embodiment, it will be understood by those skilled in the art that various other changes in form and detail may be made without departing from the spirit and scope of the invention.

What is claimed is:

1. A processor for performing a plurality of arithmetic functions comprising:
   multiplier circuitry for calculating the product of two or more numbers;
   logic circuitry for reconfiguring said multiplier into a first array and a second array wherein said first and second arrays calculate products;
   operand routing circuitry for directing one set of numbers to said first array and another set of numbers to said second array;
   registers for directing said products to said operand routing circuitry a predetermined number of iterations;

adder circuitry for combining said products after said predetermined number of iterations to produce a result.

2. The processor of claim 1 wherein said multiplier is an adder tree.

3. The processor of claim 1 further comprising circuitry for generating seed value numbers and directing said seed value numbers to said operand routing circuitry.

4. The processor of claim 1 wherein said registers have associated intermediate storage circuits for accumulating intermediate results.

5. The process of claim 1 wherein the specified number of iterations is determined by a control signal.

6. The process of claim 1 further comprising rounding circuitry connected to said adder circuitry for rounding said result.

7. A processor for performing a plurality of arithmetic functions comprising:
   decoder circuitry for determining which one of said arithmetic functions is performed and for transmitting a control signal indicating the arithmetic function performed;
   multiplier circuitry for calculating the product of two or more numbers;
   logic circuitry responsive to said control signal for reconfiguring said multiplier into a first array and a second array wherein said first and second arrays calculate independent products;
   operand routing circuitry, responsive to said control signal, for directing one set of numbers to said first array and another set of numbers to said second array in accordance with said control signal;
   registers for directing said products to said operand routing circuitry a predetermined number of iterations;
   adder circuitry for combining said products to produce a result; and
   switching circuitry, responsive to said control signal, for directing said products to said adder circuitry in accordance with said control signal.

8. The processor of claim 7 wherein said multiplier is an adder tree.

9. The processor of claim 7 further comprising generator circuitry for generating seed value numbers and directing said seed value numbers to said operand routing circuitry.

10. The processor of claim 9 wherein said generator circuitry includes a random access memory.

11. The process of claim 7 wherein said registers have associated intermediate storage circuits for accumulating intermediate results.

12. The processor of claim 7 further comprising rounding circuitry connected to said adder circuitry for rounding said result.

13. A method for performing an arithmetic function comprising the steps of:
   reconfiguring a multiplier for calculating the product of two or more numbers into a first array and a second array;
   directing a first set of numbers to said first array and a second set of numbers to said second array;
   calculating the product of said first set of numbers in said first array and calculating the product of said second set of numbers in said second array;
   directing said products back to said multiplier a specified number iterations; and
   combining said products after said predetermined number of iterations to produce a result.

14. The method of claim 13 further comprising the steps of generating a seed value number and transmitting said seed value number to said multiplier.

* * * * *